(12) United States Patent
Schwanke et al.

(10) Patent No.: US 9,371,785 B2
(45) Date of Patent: Jun. 21, 2016

(54) VEHICLE AND METHOD OF OPERATING

(71) Applicant: Robert Bosch GmbH, Stuttgart (DE)

(72) Inventors: Jason Schwanke, Southfield, MI (US); Jeffrey S. Sterniak, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 60 days.

(21) Appl. No.: 14/542,225

(22) Filed: Nov. 14, 2014

(65) Prior Publication Data

US 2016/0138493 A1    May 19, 2016

(51) Int. Cl.
| | |
|---|---|
| *F02D 29/02* | (2006.01) |
| *B60K 6/38* | (2007.10) |
| *F02B 73/00* | (2006.01) |
| *F02P 1/00* | (2006.01) |
| *B60W 20/00* | (2016.01) |
| *B60W 10/08* | (2006.01) |
| *B60W 10/06* | (2006.01) |
| *B60W 10/18* | (2012.01) |
| *B60K 6/26* | (2007.10) |
| *B60K 6/40* | (2007.10) |

(52) U.S. Cl.
CPC . *F02D 29/02* (2013.01); *B60K 6/26* (2013.01); *B60K 6/38* (2013.01); *B60K 6/40* (2013.01); *B60W 10/06* (2013.01); *B60W 10/08* (2013.01); *B60W 10/18* (2013.01); *B60W 20/1062* (2013.01); *F02B 73/00* (2013.01); *F02P 1/00* (2013.01); *B60K 2006/268* (2013.01); *Y10S 903/906* (2013.01); *Y10S 903/912* (2013.01); *Y10S 903/951* (2013.01)

(58) Field of Classification Search
CPC ......... F02D 20/02; F02D 17/02; F02N 11/00; F02N 17/00; F02N 15/02; B60K 6/38; B60K 6/40; B60K 6/04; B60W 10/08; B60W 10/18; B60W 20/00

USPC ......... 701/22, 101, 201, 103, 109; 180/65.28; 123/179.25, 179.28
See application file for complete search history.

(56) References Cited

U.S. PATENT DOCUMENTS

| | | | |
|---|---|---|---|
| 5,899,828 | A | 5/1999 | Yamazaki et al. |
| 6,769,387 | B2 | 8/2004 | Hayman et al. |

(Continued)

FOREIGN PATENT DOCUMENTS

EP    1232895    8/2002

OTHER PUBLICATIONS

Zizelman, "Valvetrain Technologies: Robust, High Value Solutions for CO2 Reduction and Improved Fuel Economy," Delphi, dated Oct. 20, 2013 (21 pages).

*Primary Examiner* — Tan Q Nguyen
(74) *Attorney, Agent, or Firm* — Michael Best & Friedrich LLP

(57) ABSTRACT

A method for operating a vehicle is provided with an electric machine connected to a battery of less than 150 volts and coupled to an internal combustion engine such that a crankshaft of the engine rotates at all times the electric machine operates to supply power from the battery and all times the electric machine operates to capture power for storage in the battery. Motive force is provided to the vehicle with power output by the internal combustion engine. During movement of the vehicle, ignition of the engine is ceased in response to an engine load below a specified threshold. Pumping losses and drive train drag are reduced by altering at least one mechanical property of the internal combustion engine.

20 Claims, 5 Drawing Sheets

(56) References Cited

U.S. PATENT DOCUMENTS

| | | | |
|---|---|---|---|
| 8,177,016 B2 * | 5/2012 | Tai | B60K 6/12 180/302 |
| 8,464,690 B2 | 6/2013 | Yuille et al. | |
| 2003/0127262 A1 | 7/2003 | Noreikat et al. | |
| 2006/0174624 A1 | 8/2006 | Grabowski et al. | |
| 2008/0196954 A1 | 8/2008 | Soliman et al. | |
| 2010/0087290 A1 | 4/2010 | Schoenek et al. | |
| 2012/0071294 A1 | 3/2012 | Ishikawa | |
| 2013/0297122 A1 | 11/2013 | Gibson et al. | |
| 2013/0309104 A1 * | 11/2013 | Schultz | F16H 57/0439 417/319 |
| 2014/0038775 A1 * | 2/2014 | Heap | F02D 41/068 477/100 |
| 2014/0073478 A1 | 3/2014 | Hashemi et al. | |

* cited by examiner

VEHICLE AND METHOD OF OPERATING

BACKGROUND OF THE INVENTION

With an increase in government regulations directed towards reducing pollution and increasing vehicle fuel economy, many automotive manufacturers and suppliers are focusing on improvements and advancements in fuel-saving technologies. One area of advancement has manufacturers coupling a small electric machine to an internal combustion engine of a vehicle to create a mild hybrid vehicle. Mild hybrid vehicles generally function like standard hybrid vehicles, with the capability of regenerative braking; however, there is no exclusive electric-only mode of propulsion. To further improve fuel economy, a vehicle that utilizes a clutch (e.g., manual transmission vehicle) is capable of stop-start coasting operation in which the engine is off while the vehicle continues to move. Stop-start coasting is an advancement of stop-start technology in which the engine is turned off when the vehicle comes to a stop. During stop-start coasting operations, the transmission path between the internal combustion engine and the wheels can be severed. This removes the drag torque and pumping losses of the internal combustion engine. When an engine load increases, for example in response to an acceleration request, the engine is reconnected to the wheels and once again provides motive power to the wheels.

SUMMARY OF THE INVENTION

The invention provides, in one aspect, a method for operating a vehicle. The method includes providing an internal combustion engine and an electric machine coupled to one another such that a crankshaft of the engine rotates at all times the electric machine operates to supply power from the battery and all times the electric machine operates to capture power for storage in the battery. The electric machine is connected to a battery of less than 150 volts. Motive force is provided to the vehicle with power output by the internal combustion engine. During movement of the vehicle, ignition of the engine is ceased in response to an engine load below a specified threshold. Pumping losses and drive train drag are reduced by altering at least one mechanical property of the internal combustion engine.

The invention provides, in another aspect, a vehicle. The vehicle includes an internal combustion engine and an electric machine coupled to one another such that a crankshaft of the engine rotates at all times the electric machine is supplying power from the battery and at all times the electric machine is capturing power for storage in the battery. The electric machine is connected to a battery of less than 150 volts. The vehicle is operable in a first mode of operation in which the vehicle is powered by the internal combustion engine. The vehicle is also operable in a second mode of operation which is activated by the detection of an engine load below a threshold. During the second mode, ignition within the internal combustion is ceased and at least one mechanical property of the internal combustion engine is altered to reduce pumping losses and drive train drag.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 2:
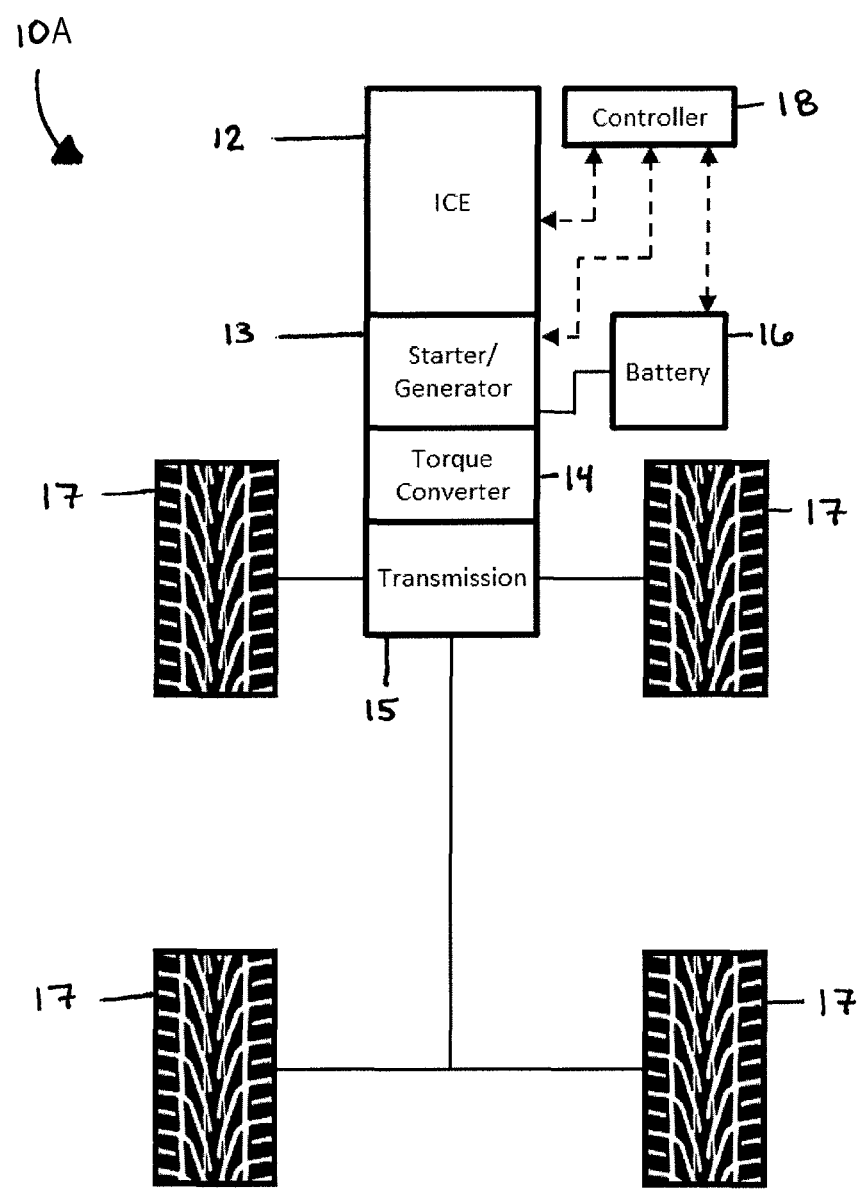
FIG. 2 is a schematic view of one embodiment of a vehicle.

FIG. 2 schematically depicts a vehicle 10A having a mild-hybrid power train.

The vehicle 10A includes an internal combustion engine 12 configured to provide motive power to at least one wheel 17 of the vehicle 10A. The vehicle 10A includes four wheels 17 as illustrated, but alternate numbers of wheels are optional in other configurations. One or more of the wheels 17 can be driven wheels (e.g., front-wheel drive, rear-wheel drive, all-wheel drive, etc.). The internal combustion engine is a part of a drive train of the vehicle 10A that also includes an electric machine 13, a torque converter 14, and a transmission 15 (e.g., multiple-speed transmission). The electric machine 13 is electrically connected to a battery 16 and can be configured to operate as a generator to supply electrical power to the battery 16. The electric machine 13 can also be configured to operate as a motor to optionally supplement the internal combustion engine 12; however, the vehicle 10A cannot be driven solely by the electric machine. In some constructions, the electric machine 13 is provided as a starter/generator operable as a motor for starting the engine 12 from a non-running state. The electric machine 13 can be integrated with the engine 12 (e.g., an integrated starter/generator) rather than a separate component attachable and removable from the engine 12. Whether integrated or not, the internal combustion engine 12 of FIG. 2 is directly, mechanically connected to the electric machine 13 such that a crankshaft 48 (FIG. 4) of the internal combustion engine 12 must rotate at all times the electric machine 13 operates to supply power from the battery 16 and all times the electric machine 13 operates to capture power for storage in the battery 16 (i.e. the crankshaft 48 is locked for rotation with a rotor of the electric machine to prevent relative rotation).

A torque converter 14 is mechanically connected to an output of the internal combustion engine 12 and/or the electric machine 13 at a location between the electric machine 13 and the transmission 15. The torque converter 14 transmits torque to the transmission 15 from the engine 12 and the electric machine 13 through an internal fluid. Although the torque converter may have a lock-up clutch to limit fluid losses at higher speeds, the torque converter 14 lacks a true disconnection capability like a conventional clutch (e.g., of a manual transmission, or a dual-clutch automatic transmission). The engine power is dissipated through the fluid within the torque converter 14 when the vehicle 10A stops with the engine 12 running and the transmission 15 in gear. For example, the transmission 15 can be an automatic transmission that remains in gear when the vehicle comes to a brief stop. The battery 16 can be one battery or multiple batteries, and can also refer to a battery pack. As mentioned above, the battery can supply power to the electric machine 13 and can be recharged by operation of the electric machine 13. The electric machine 13 and the battery 16 are part of an electrical system having a maximum system voltage of less than 150 volts (e.g., 12 volts, 48 volts, etc.). A controller 18 is electrically coupled to the engine 12, the electric machine 13, and the battery 16 to monitor various parameters and/or control various operational characteristics. The controller 18 can be the main vehicle ECU or can be an additional auxiliary controller.

Figure 3:
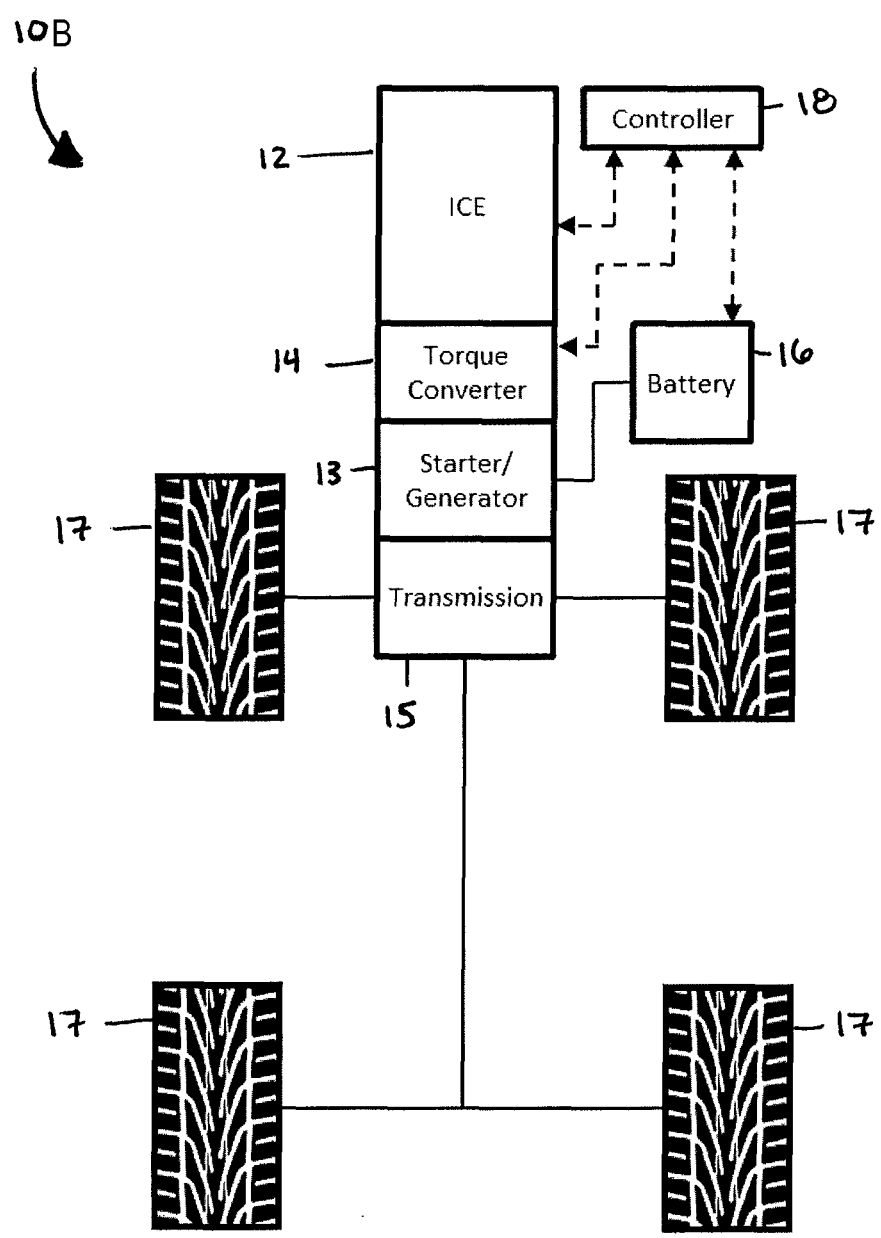
FIG. 3 is a schematic view of another embodiment of a vehicle.

FIG. 3 depicts a vehicle 10B having a mild hybrid power train similar to the vehicle 10A of FIG. 2. Similar to the vehicle 10A of FIG. 2, the vehicle 10B cannot be driven solely by the electric machine 13. The difference is the location of the torque converter 14 with respect to the electric machine 13. The internal combustion engine 12 of FIG. 3 is mechanically connected to the electric machine 13, through the torque converter 14. This allows the engine 12 to rotate without the electric machine 13 (e.g. idling when the vehicle 10B is stopped). Similar to the vehicle 10A of FIG. 2, the internal combustion engine 12 rotates at all times the electric machine 13 operates to supply power from the battery 16 or capture power for storage in the battery 16. In a scenario where the wheels 17 are not rotating, the electric machine 13 is not capable of supplying or capturing power. In an alternative scenario where the wheels 17 are rotating, the electric machine 13 can optionally be operated as a motor or generator, but this has the effect of also driving rotation of the engine 12 through the torque converter 14. Similar to the vehicle 1 OA of FIG. 2, the internal combustion engine 12 must rotate at all times the electric machine 13 operates to supply power from the battery 16 and all times the electric machine 13 operates to capture power for storage in the battery 16. This is a result of the torque converter 14 not having a true disconnection capability like a conventional clutch (e.g., of a manual transmission, or a dual-clutch automatic transmission). In some constructions, the electric machine 13 is a starter/generator operable for starting the engine 12 from a non-running state.

In order to improve fuel economy, the vehicles 10A, 10B are capable of stop-start coasting or fuel cut-off operations. A fuel cut-off operation is one in which the engine 12 is shut off while the vehicle 10A, 10B is driving. A stop-start coasting operation is one in which the engine 12 is shut off and the transmission 15 is placed into neutral while the vehicle 10A, 10B is driving. Although it would be beneficial to decouple the engine 12 and the electric machine 13 from the wheel(s) 17 during braking and coasting operations, the torque converter 14 lacks the aforementioned decoupling capability. Therefore, unless the transmission 15 is placed into neutral where no power generation from the electric machine 13 is possible, the crankshaft 48 (FIG. 4) of the engine 12 must continue to rotate as the wheel(s) 17 rotate. Consequently, when regeneration is requested, fuel cut-off would normally produce significant pumping losses within the engine 12, lead to a rapid deceleration of the vehicle, and significantly reduce the available energy transferable to the battery 16. The pumping losses and ill effects increase with engine displacement and with compression ratio, and have prevented mainstream adoption of stop-start coasting or fuel cut-off operation with mild hybrid electrification in torque converter-equipped vehicles.

Figure 1:
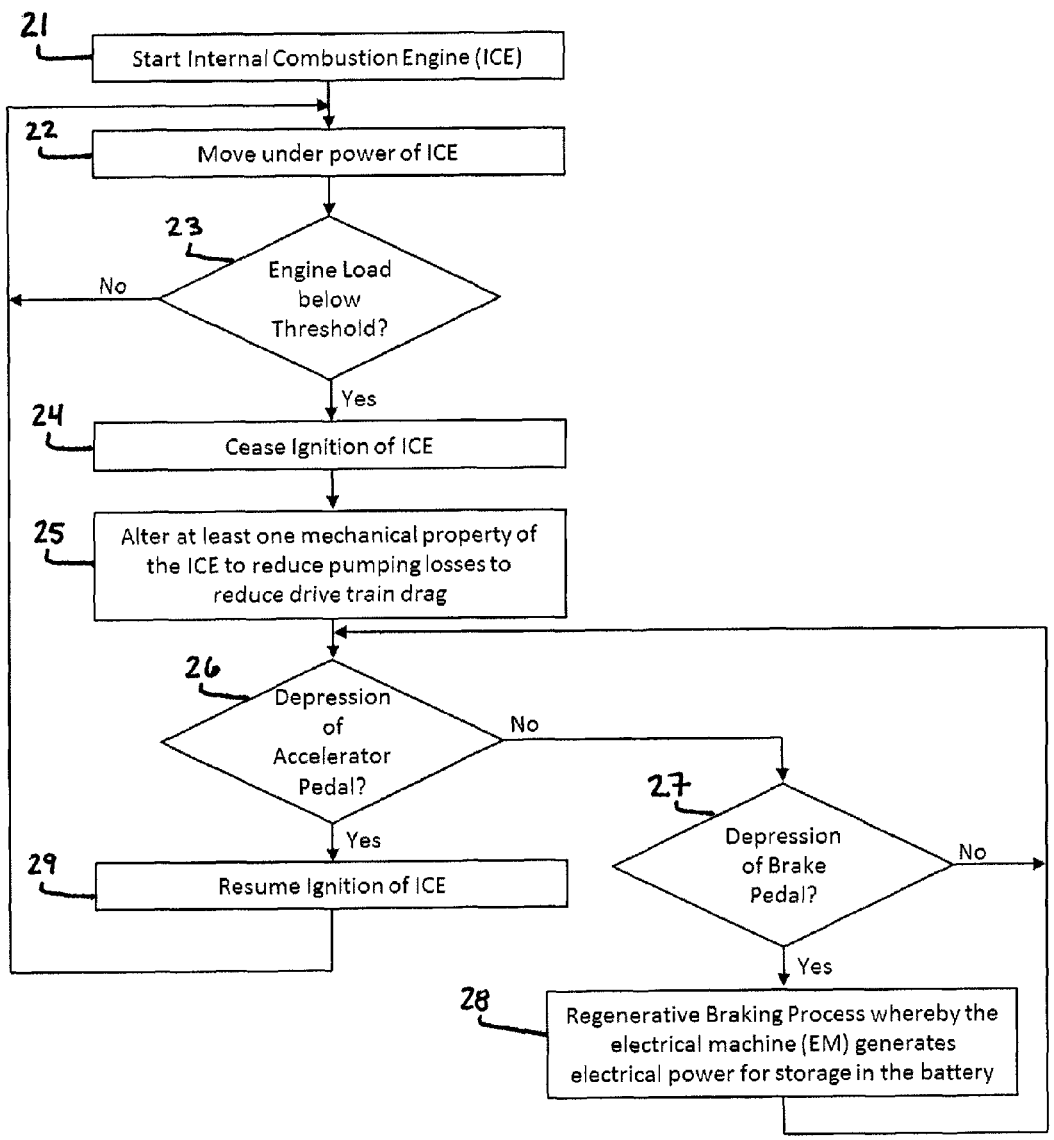
FIG. 1 is a flowchart presenting a method for operating a vehicle.

FIG. 1 is a flowchart presenting a method for operating a vehicle, which may apply to either of the vehicles 10A, 10B or FIGS. 2 and 3. In a first step 21, the internal combustion engine 12 is started. The engine 12 is part of a vehicular drive train to provide motive power to at least one driven wheel 17. Therefore, the second step 22 allows the vehicle to move under power of the internal combustion engine 12, according to a first mode of operation. At the following step 23, the controller 18 checks whether engine load is below a specified threshold. Engine load is defined as the amount of torque put out by the engine 12 and the specified threshold is dependent on the size of the engine. A reduced engine load is often seen in coasting or downhill operations. If the engine load is not below the specified threshold, the engine 12 continues to power the vehicle and the controller 18 continues to monitor the engine load. If the engine load is below the specified threshold, additional steps 24, 25 cease ignition within the internal combustion engine 12 and alter at least one mechanical property of the internal combustion engine 12 to reduce a pumping loss and therefore reduce the overall drag within the drive train, according to a second mode of operation. This allows the vehicle to maintain speed longer than if the engine 12 were spinning. Alternatively, the transmission 15 can be placed in neutral (under electronic control), separating the engine 12 from the wheels, resulting in no engine drag, but also no electric power generation capability.

Once the vehicle is in the second mode of operation, the controller 18 monitors the accelerator pedal at step 26 for any input from a human operator. At step 27, the controller 18 monitors the brake pedal for any input from the operator should it receive a negative response to step 26. If there is no depression of the brake pedal either, the controller 18 once again checks the accelerator pedal at step 26. If a depression of the brake pedal is sensed in step 27, a regenerative braking process is performed by an electric machine as shown by step 28 (e.g., activated by the controller 18). During this process, if the engine 12 is disconnected through the transmission 15, it is reconnected to allow coupling between the electric machine 13 and the wheels 17. At least one mechanical property within the internal combustion engine 12 is modified to reduce the pumping losses and therefore reduce the overall drag within the drive train and maximize the amount of electric energy that can be captured. Following a completion of the regenerative braking process, the controller 18 continues to search for a depression of the accelerator pedal at step 26. Step 29 allows the ignition of the internal combustion engine 12 to be resumed should the accelerator pedal be depressed. The engine 12 can remain in the second mode of operation as it is restarted. In this way, the diminished compression resistance within the engine 12 makes it easier for the starter motor (e.g., the electric machine 13) to start the engine 12. The method then continues by moving the vehicle under power of the internal combustion engine 12 at step 22.

Figure 4:
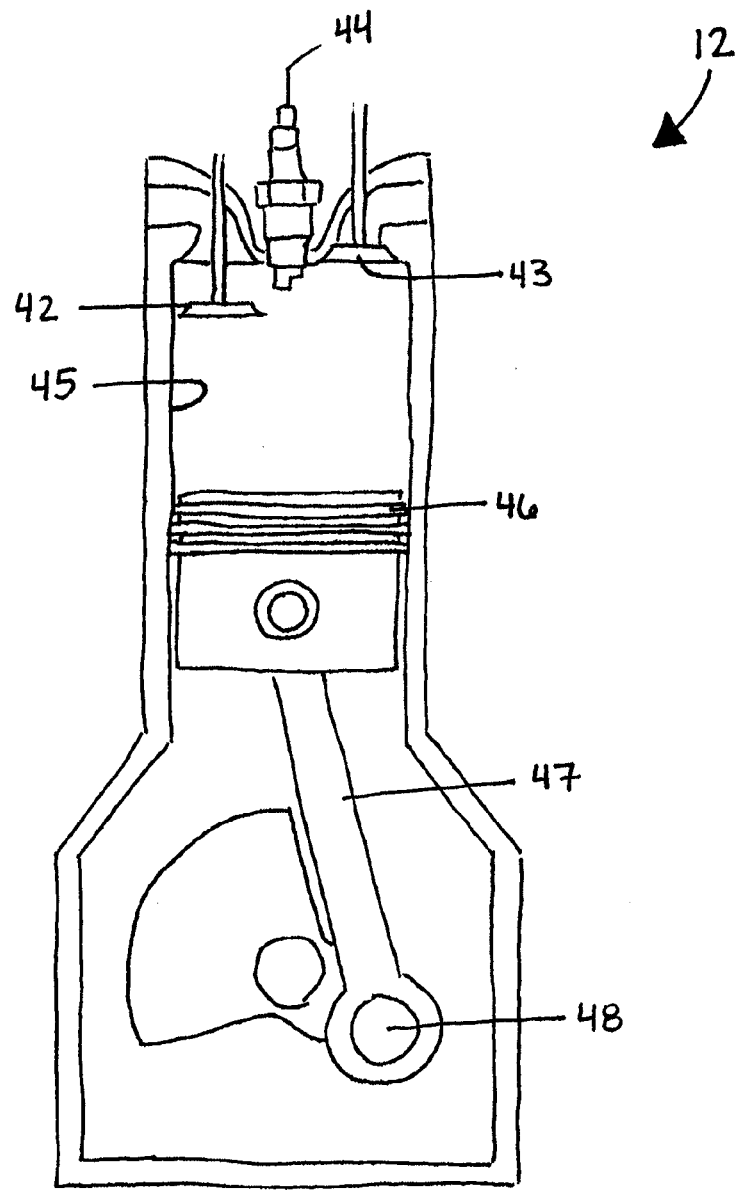
FIG. 4 is a simplified cross-sectional view of a representative piston cylinder of an internal combustion engine.

FIG. 4 shows a representative cross-section of the engine 12. The engine 12 may have one or more cylinders arranged in any suitable configuration. A piston 46 is positioned in a corresponding bore 45 of each cylinder to reciprocate therein. All of the pistons 46 of the engine 12 are coupled to a common crankshaft 48 by respective connecting rods 47. In the case of a typical gasoline combustion engine, a spark plug 44 is positioned in each cylinder and configured to ignite a compressed fuel/air mixture at a predetermined point of each engine cycle (although in other engines, such as diesel engines, fuel and air may be ignited to combust with compression alone). The fuel may be sprayed directly or indirectly into each cylinder with one or more fuel injectors (not shown). When ignition is ceased within the engine 12, fuel and/or spark to all cylinder(s) are terminated and combustion of fuel and air does not occur (e.g., the spark plug 44 no longer provides spark to the cylinder 45). However, as the crankshaft 48 is required to continue rotating when the wheels 17 of the vehicle rotate, the piston 46 continues to reciprocate within the cylinder bore 45. Without counteractive measures, this creates large pumping losses within the engine 12, which is essentially operating as an air pump.

In order to reduce pumping losses when the engine 12 is rotating with ignition ceased, at least one mechanical property of one or more of the cylinders of the engine 12 can be modified. For example, the timing of at least one exhaust valve 43 and at least one intake valve 42 can be adjusted to change the amount of valve overlap. This includes scenarios of extreme valve overlap (e.g., in excess of 60 crank angle degrees). This means that both the intake valve 42 and the exhaust valve 43 are simultaneously open. Additionally, a period of time exists where both the intake valve 42 and the exhaust valve 43 are fully closed. Alternatively, the timing of the intake valve 42 can be adjusted to close the intake valve 42 before or after the cylinder of the engine 12 reaches bottom dead center, thereby reducing the total trapped air mass and peak compression pressures.

Additionally or alternatively, the compression ratio of one or more of the engine's piston cylinders can be varied by adjusting the displaced volume (e.g., varying the stroke of the piston 46 between top dead center and bottom dead center). This can be accomplished by, for example, manipulating an additional link located between the connecting rod and the crankshaft (e.g., with an electric actuator), or manipulating the length of the connecting rod (e.g., with oil pressure). Further, the piston and connecting rod can be disconnected from the crankshaft.

Figure 5:
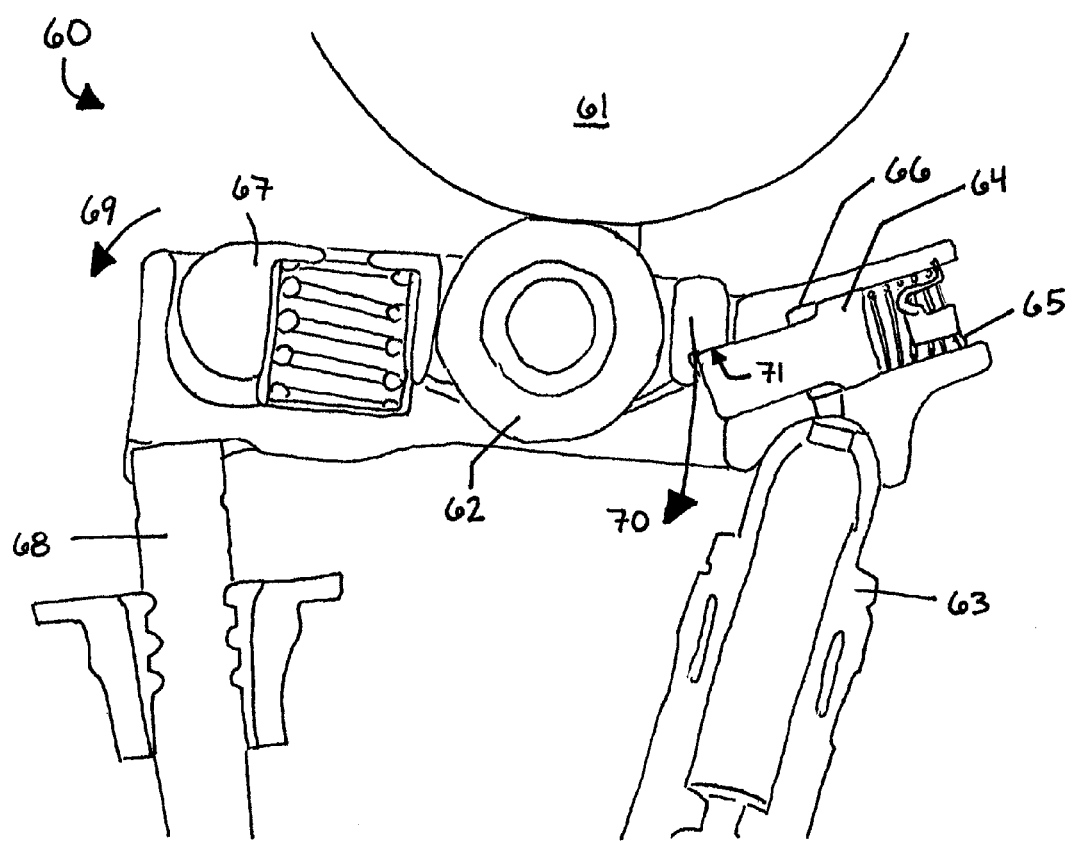
FIG. 5 is a cross-sectional view of a representative roller finger follower of the internal combustion engine.

FIG. 5 shows yet another way in which the internal combustion engine 12 can be modified to reduce the pumping losses and drive train drag. This alternative can be used in conjunction with any of the previously mentioned methods of reducing pumping losses or can be implemented on its own. A representative roller finger follower 60 is shown below a lobe 61 of the camshaft. A cam follower 62 (e.g., roller wheel) is located directly adjacent and tangent to the lobe 61 so that the cam follower 62 maintains contact with the lobe 61 and rotates at all times the lobe 61 is rotating. As the lobe 61 has a non-circular profile, the cam follower 62 is pushed in a downward direction until it encounters the point of the lobe 61 located farthest from the rotational axis of the lobe 61. During normal operation, this causes the rocker mechanism 67 to push down on the valve stem 68 of an exhaust or intake valve 43, 42, and open the valve (e.g., the intake valve 42 in FIG. 4). The rocker mechanism 67 is supported by a lash adjuster 63 which allows the rocker mechanism 67 to rotate as shown by arrow 69. The lash adjuster 63 is supplied with a fluid which is capable of filling a channel 66 that surrounds a biased block 64. When an increased fluid pressure is not present, the biased block 64 is pressed by a biasing spring 65 into a position to support a lower surface 71 of the rocker mechanism 67. When the fluid pressure inside the channel 66 is great enough to overcome the force from the biasing spring 65, the biased block 64 is pushed into the channel 66 away from the cam follower 62. This removes the fixed support provided by the biased block 64 and allows the end of the rocker mechanism 67 opposite the valve stem 68 to rotate, or collapse, as shown by arrow 70. Therefore, the valve stem 68 is not depressed and the valve 42, 43 (FIG. 4) does not open in response to actuation by the cam lobe 61. This prohibits new air from entering or leaving the cylinder 45, and therefore limits the pumping losses of the engine 12. This modification can occur in a plurality of roller finger followers 60 which can include every roller finger follower 60 for each intake and exhaust valve 42, 43 of each cylinder or can be simplified to only correlate to a specific number of cylinders less than the total number of cylinders. While the engine shown in FIG. 5 utilizes an overhead cam, other suitable alternatives such as pushrods can also be employed.

Alternatively, the valve profile can be modified such that the intake or exhaust valves 42, 43 or both, are held slightly open when functioning in the second mode of operation. This eliminates compression within the cylinder, thereby reducing the drag losses of the engine.

Alternatively, or in addition to the method illustrated in FIG. 1 which relies on human inputs, a vehicular mechanism such as cruise control system can also function in certain instances. Cruise control operation maintains a relatively constant vehicle speed under engine power, and under various conditions where the vehicle speed tends to increase without increasing engine load, can identify a scenario where the vehicle can coast without use of the engine 12. The pumping losses can be reduced during coasting (e.g., in accordance with one or more of the above engine modifications). In addition to the human inputs which can stop the coasting operation and restart the engine 12, the cruise control system may automatically restart the engine 12 when the vehicle speed begins to decrease.

Although the invention has been described in detail with reference to certain preferred embodiments, variations and modifications exist within the scope and spirit of one or more independent aspects of the invention as described.

What is claimed is:

1. A method of operating a vehicle, the method comprising:
providing an internal combustion engine;
providing an electric machine connected to a battery of less than 150 volts and coupled to the internal combustion engine such that a crankshaft of the internal combustion engine rotates at all times the electric machine operates to supply power from the battery and all times the electric machine operates to capture power for storage in the battery;
providing motive force to the vehicle with power output by the internal combustion engine;
during movement of the vehicle, ceasing ignition of the internal combustion engine in response to an engine load below a threshold; and
with ignition ceased, altering at least one mechanical property of the internal combustion engine to reduce pumping losses to reduce drive train drag.

2. The method of claim 1, further comprising:
providing a transmission between the internal combustion engine and at least one vehicle wheel; and
placing the transmission into a neutral position during movement of the vehicle when the engine load is below the threshold.

3. The method of claim 1, further comprising:
sensing an input from a human operator of the vehicle; and
resuming ignition of the internal combustion engine.

4. The method of claim 3, wherein the input includes a depression of an accelerator pedal.

5. The method of claim 3, wherein the input includes a depression of a brake pedal.

6. The method of claim 5, further comprising decelerating the vehicle with a regenerative braking process whereby the electric machine generates electrical power for storage in the battery in response to the depression of the brake pedal.

7. The method of claim 3, wherein the electric machine is an integrated starter generator, the method further comprising energizing the electric machine to start the internal combustion engine while the at least one mechanical property is altered to reduce pumping losses.

8. The method of claim 1, further comprising:
providing a torque converter between an internal combustion engine and an electric machine; and
wherein providing motive force to the vehicle includes transmitting internal combustion engine power to at least one vehicle wheel through the torque converter.

9. The method of claim 1, further comprising:
providing a torque converter between an electric machine and at least one vehicle wheel; and
wherein providing motive force to the vehicle includes transmitting internal combustion engine power to the at least one vehicle wheel through the torque converter.

10. The method of claim 1, wherein altering at least one mechanical property of the internal combustion engine includes manipulating a valve train.

11. The method of claim 10, wherein manipulating the valve train includes collapsing a plurality of roller finger followers such that actuation of the plurality of roller finger followers by a camshaft does not result in opening of a corresponding plurality of valves of the valve train.

12. The method of claim 1, wherein altering at least one mechanical property of the internal combustion engine includes adjusting the timing of at least one exhaust valve and at least one intake valve to produce a negative valve overlap.

13. The method of claim 1, wherein altering at least one mechanical property of the internal combustion engine includes substituting a high compression ratio for a low compression ratio in at least one piston cylinder of the internal combustion engine.

14. A vehicle comprising:
an internal combustion engine; and
an electric machine connected to a battery of less than 150 volts and coupled to the internal combustion engine such that a crankshaft of the internal combustion engine rotates at all times the electric machine is supplying power from the battery and at all time the electric machine is capturing power for storage in the battery,
wherein the vehicle is operable in a first mode of operation in which the vehicle is powered by the internal combustion engine, and
wherein, activated by the detection of an engine load below a threshold, the vehicle is operable in a second mode of operation in which ignition of the internal combustion engine is ceased and at least one mechanical property of the internal combustion engine is altered to reduce pumping losses and drive train drag.

15. The vehicle of claim 14, wherein the internal combustion engine is configured to switch from the second mode of operation to the first mode of operation via an input from a human operator of the vehicle.

16. The vehicle of claim 15, wherein the input includes a depression of an accelerator pedal.

17. The vehicle of claim 15, wherein the input includes a depression of a brake pedal.

18. The vehicle of claim 17, wherein the electric machine is operable to generate electrical power for storage in the battery in response to the depression of the brake pedal.

19. The vehicle of claim 14, wherein the electric machine is an integrated starter generator operable to start the internal combustion engine when energized.

20. The vehicle of claim 14, further comprising a torque converter located between the electric machine and at least one vehicle wheel or between the electric machine and the internal combustion engine.

\* \* \* \* \*